Sept. 9, 1969     H. L. BALDERSTON     3,466,544
INTEGRATED CIRCUITS HAVING INTEGRATED TEST TRANSFORMATION
NETWORKS INCORPORATED THEREWITH ON COMMON SUBSTRATE CHIPS
Filed Oct. 18, 1965
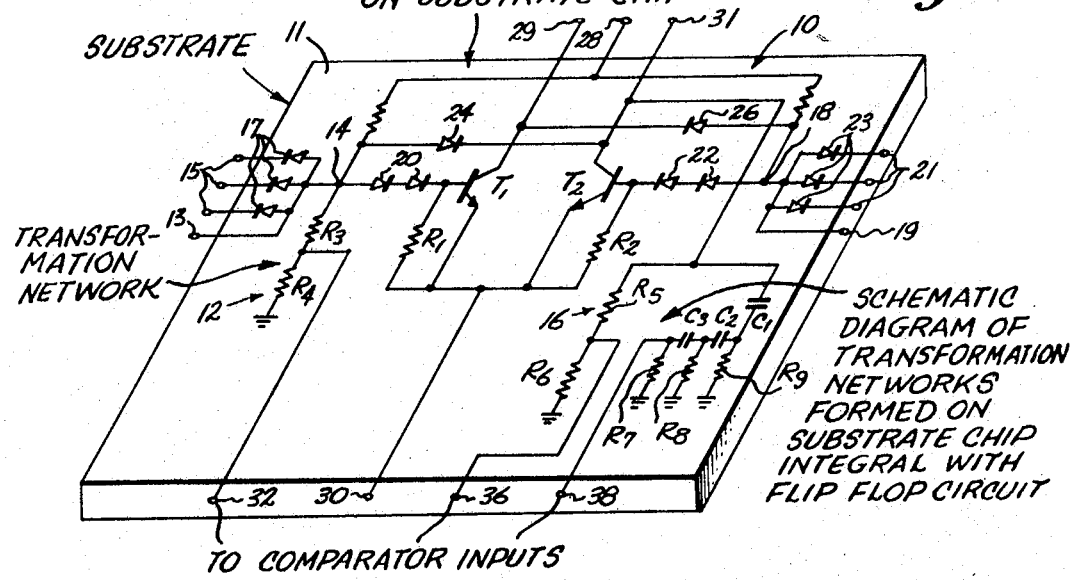
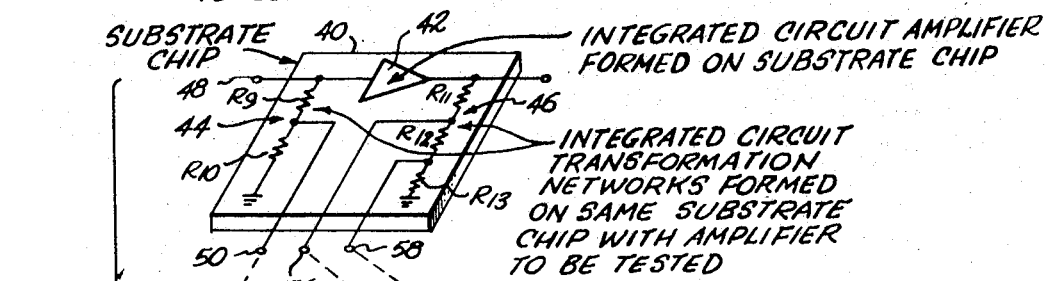
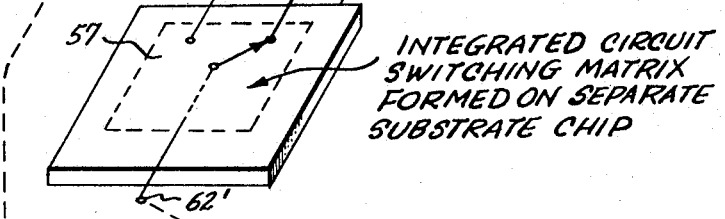
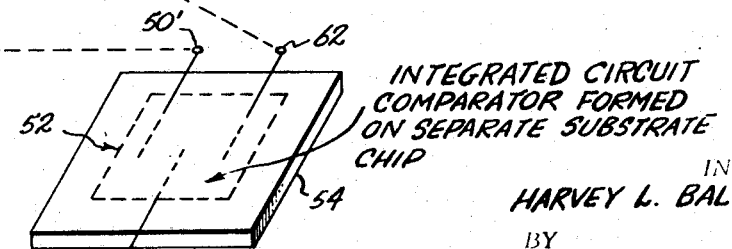
INVENTOR.
HARVEY L. BALDERSTON
BY
Orland M. Christensen
ATTORNEY United States Patent Office  3,466,544
Patented Sept. 9, 1969

3,466,544
INTEGRATED CIRCUITS HAVING INTEGRATED TEST TRANSFORMATION NETWORKS INCORPORATED THEREWITH ON COMMON SUBSTRATE CHIPS
Harvey L. Balderston, Seattle, Wash., assignor to The Boeing Company, Seattle, Wash., a corporation of Delaware
Filed Oct. 18, 1965, Ser. No. 496,981
Int. Cl. G01r 17/10
U.S. Cl. 324—158                    3 Claims

ABSTRACT OF THE DISCLOSURE

Integrated circuit systems are disclosed which incorporate on the same substrate chip interconnected operational and test transformation networks mutually adapted to one another to prevent interference therebetween as to their respective operational functions. The test transformation networks convert operating parameters of the operational circuit to test parameters in the transformation network and thus continuously provide test parameters or signals from which to detect operating conditions of the operational circuit, without interference with operational circuit conditions.

Background and summary of the invention

This invention relates to circuit apparatus of the type wherein electrical elements are deposited or otherwise formed on a physical substrate and interconnected to form an operational circuit. More particularly it relates to the combination in such apparatus of operational circuits and test transformation networks formed integrally therewith on the same physical substrate and adapted to convert or transfer operational circuit parameters to test parameters at the network output, without interference with normal functioning of the operational circuits themselves, and by means of which operating conditions of the latter may be tested. While the invention is herein described in terms of preferred and exemplary forms thereof, it will be recognized by those skilled in the art that various modifications and adaptations may be made without departing from the essential features involved.

The construction of electronic circuits in smaller and more compact forms in the progression from electronic discharge tubes to semiconductor elements, to printed circuit boards, and finally to integrated circuits and microminiaturization, has necessitated the development of test equipment of commensurate size and similar nature. This has been particularly true in the case of systems designed for high mobility such as in aircraft, space vehicles and missiles, in order to permit monitoring of critical elements and subsystems therein for error and failure detection and other purposes. Because of relatively long flight times and mission importance it is no longer feasible to test equipment operation only at ground stations between uses of the system and by means of bulky test equipment connected to operational systems by means of complex interconnection cables, intricate umbilicals, long transmission lines, or the like. Nor it is feasible to carry extensive external test equipment along with operational systems. The development of more compact systems in units or modules requires that they be limited in number and size and be adapted for continuous or intermittent in-operation testing.

It is now mandatory that very compact and reliable test equipment be incorporated as part of the operational equipment to be tested. In accordance with this invention, test transformation networks are incorporated physically and electrically with integrated circuits which are part of an operational system, and the operational and test components of the integrated combination are mutually adapted for performance of their respective operational and test functions during system operation.

Thus the invention consists in providing, in circuit apparatus of the type consisting of a physical substrate and electrical elements deposited thereon and electrically interconnected to form an operational circuit, the combination of an operational electronic circuit and a test transformation network interconnected therewith, where both the circuit and the network comprise electrical elements formed on the same physical substrate and include isolation means for mutually adapting the circuit and network to perform operational and test functions, respectively, each without significant electrical interference with the operation of the other. The transformation network further includes connections to test points in the operational circuitry, means for converting operational circuit parameters at the test points to a test parameter in the network, and an output for the test parameter from which to detect operating conditions of the operational circuit.

While the aforementioned isolation means segregates operational and test functions, it typically includes means for rendering certain elements in the circuitry functional in either operational or test modes, or both. This capability for providing dual functions for certain elements in the combination results in further conservation of circuitry, reduction in weight and volume, and other advantages, in addition to the advantages of compactness and reliability flowing from the proximity of the two types of elements. The integrated transformation networks physically located on the same substrate and as a part of the circuit being tested, are less subject to interference and error in the test function, since the employment of long leads or complex interconnections between operational and test equipments are eliminated.

The conversion of operational circuit parameters into a test or measurement parameter by the transformation network permits the selection of a suitably sensitive indicator of the operation parameter being evaluated. In addition, this feature permits the use of simpler, less expensive, more compact and otherwise more convenient evaluation circuitry for the testing of the different and varied operational circuit parameters existing, either in the same circuit and in different circuits or subsystems. Thus cost, weight and volume are further reduced. For example, in a missile system containing a large number of integrated circuits, it would be feasible to utilize a variety of transformation networks which would convert the operational parameters necessary to achieve a complete evaluation of the system into a single selected test parameter, such as peak-to-peak voltage, direct current, or other test quantity, and the test or measurement would in turn be evaluated by a comparator or computer or other monitoring device forming part of the total system. The comparator or computer may be adapted to perform other functions, such as navigation, besides its error or failure detection function.

In addition to the advantages and purposes noted in the foregoing discussion, the invention has as a further object the solution of the difficult problem of making contact for test purposes with essential parts of microminiaturized circuitry, and the elimination of a multiplicity of connections and leads to and from operational circuitry for test purposes. That is, the transformation networks provide permanent integrated connections to critical test points in the operational circuitry with convenient outputs from the transformation networks themselves whereby the test parameter can be monitored to determine operating conditions in the operational circuitry, without necessity for plug-in or switching connections to the operational circuitry itself.

A further purpose and object of the invention is to provide integrated test equipment adapted for use with a variety of different evaluation systems, including digital "go," "no-go" monitoring means, analog signal analyzers telemetry reporting systems, status panels with lights or other indicators, or programmed memory storage arrangements. The test equipment may include automatic switching means responsive to the reporting system for replacing failed components or modules with redundant components or modules, or the storing of results of tests and reporting as programmed, or on demand.

In its broadest terms, then, the primary object of this invention is to increase the reliability of integrated circuit systems by reducing the possibility of error in the testing and monitoring functions.

As stated previously, each test transformation network converts a selected operational circuit parameter or quantity capable of use as an operational condition indicator into a suitable test or measurement parameter for evaluation by comparator circuits or other test equipment. Each network is preferably designed simultaneously with and as a part of the circuit with which it is associated. This combines the duties of test equipment design personnel with duties of operational equipment design personnel and requires mutual adaptation of design concepts employed by both. The required transformation network must present a high impedance to the particular circuit or function under test and otherwise provide minimum interference with the basic operational function, neither loading nor coupling the circuit under test in a way that would of itself create a malfunction or distortion. Since the invention contemplates a wide variety of adaptations of the basic concepts thereof to specific design and test requirements, it can be illustrated only in terms of very specific embodiments thereof and is not, of course, limited to any one or set of such specific applications of the principles involved.

The invention is herein described in terms of circuit apparatus of the type consisting of a physical substrate and electrical elements deposited or otherwise formed thereon and electrically interconnected to form an operation circuit. This general description of the type of advanced construction of electronic circuitry to which the invention may be applied is intended to encompass, but not to limit the invention to, so-called integrated circuits and thin film circuits such as are described in the following two publications: "Vacuum Deposition of Thin Films," L. Holland (John Wiley and Sons, 1960); "Integrated Circuit Design Principles and Fabrication," Raymond M. Warren, Jr.. and James N. Fordemwalt, Motorola, Inc. Semiconductor Products Division (McGraw-Hill, 1965). These publications describe some of the techniques for formation of microminiaturized circuitry. Generally, there are three basic techniques for formation of integrated circuits. These are the thin film technique, or vacuum deposition technique, which includes different variations in the manner in which the deposition of circuit components is performed, the diffusion furnace technique, and epitaxy. Since these techniques are known in the art, as are the techniques of printed circuit board construction of electronic systems to which the invention may also be applied, it is not deemed necessary or appropriate to describe or illustrate the actual physical appearance of a circuit constructed according to the invention. Instead, it may be best understood by those skilled in the art from diagrammatic and schematic representations of examples thereof.

Some of the operational parameters for which transformation networks have been designed and successfully tested in accordance with the invention include amplification, capacitance, resistance, voltage, current, frequency, inductance, temperature pulse amplitude rise time decay time droop, overshoot and repetition rate, and many others are of course possible.

These and other capabilities and characteristics of the invention will be more fully appreciated from the following discussion of particular exemplary embodiments of the invention illustrated in the accompanying drawing.

Brief description of the drawing

FIGURE 1 is a diagrammatic representation of an integrated circuit substrate chip showing a schematic diagram of a flip flop circuit and coupled transformation networks formed thereon.

FIGURE 2 illustrates in schematic and block diagram form an exploded view of a substrate chip with an integrated circuit amplifier and coupled transformation networks formed thereon, and on separate chips an integrated circuit switching matrix and an integrated circuit comparator, the three elements forming a relatively complete operational circuit-test equipment combination.

Description of preferred embodiments

The flip flop circuit 10 schematically illustrated as formed on the physical substrate 11 in a Westinghouse WM-202 RS flip flop having a repetition rate of 10 megacycles, and can be adequately checked with a minimum of two tests. One test is to determine the presence of a trigger voltage and the second is to determine the frequency of the output voltage or pulse. The first test is performed by means of transform network 12 connected to monitor input terminal 14, and the second is preformed by means of transform network 16 connected to monitor output terminal 31 of the circuit.

The illustrated Westinghouse flip flop circuit or bistable multivibrator 10 is an integrated circuit whose characteristics are best understood in terms of the schematic diagram shown, wherein NPN transistors $T_1$ and $T_2$ have their emitters coupled together and their respective base terminals connected through pairs of diodes 20 and 22 to input terminals 14 and 18, respectively. Resistors $R_1$ and $R_2$ establish the emitter-base voltage differentials for the respective transistors, while the required cross-connections between input terminal 14 and the collector of transistor $T_2$ and between input terminal 18 and the collector of transistor $T_1$ are made through diodes 24 and 26 respectively. Bias voltages are established through suitable voltage sources connected to terminals 28 and 30. Output pulses are derived from either or both of the transistor collectors at terminals 29 and 31.

The input transformation network 12 consisting of series resistors $R_3$ and $R_4$ connected between ground and input terminal 14 is used to measure the presence of a trigger voltage by means of a suitable comparator (not shown) connected to output terminal 32 of transformation network 12 and having its own reference voltage connection (not shown). The values of resistors $R_3$ and $R_4$ are great enough to isolate the network and comparators from flip flop circuit operation.

Transformation network 16 for evaluating output frequency consists of a resistive voltage divider comprising resistors $R_5$ and $R_6$ connected in series between the flip flop output terminal 30 and ground and having an output terminal 36 taken from between the resistors, and an RC filter network comprising capacitors $C_1$, $C_2$ and $C_3$ and resistors $R_7$, $R_8$ and $R_9$ and having an output terminal 38. Outputs 36 and 38 of the network provide inputs to a second comparator (not shown). The time constant of the RC filter network is chosen so that the 10 megacycle frequency to be measured lies outside the pass band in a region where the amplitude begins to drop. The voltage amplitude at the filter output terminal 38 is thus a function of frequency, while the output of the voltage divider at output 36 is not. Changes in frequency of the flip flop output signal will therefore affect the equality of the two inputs to the second mentioned comparators connected to outputs 36 and 38, while amplitude changes will not, since amplitude changes affect both inputs to the comparator equally. Thus the transformation network converts the operational parameter, frequency, to a suitable test or measurement parameter, voltage, for evaluation. Thus by a suitable comparator or null detector connected to the outputs of the networks, the selected parameter is evaluated during circuit operation.

The input leads 13 and 19 connected to input terminals 14 and 18, respectively, are available at the edge of the substrate chip for convenient connection to other integrated circuit chips. Auxiliary input leads 15 and 21 connected to input terminals 14 and 18 through diodes 17 and 23 are also available for connection to the circuit through AND or OR gates to logic circuitry or switching matrices enabling triggering of the flip flop circuit by trigger pulses available in different portions of the system of which it is a part.

The integrated circuit chip upon which the operational circuits and test transformation networks are integrally formed may be as small as one thirty-second of an inch square, so that numerous substrate chips carrying integrated circuit combinations may be mounted in matrices, sometimes referred to as flat packs, to form modules from which terminals protrude for the purpose of connection in more complex systems. The formation of test transformation networks in the various integrated circuits within such minute subsystems and modules is therefore highly advantageous from the standpoint of permitting in-operation testing thereof where access would be otherwise impossible.

Typically, the comparator circuits, utilized to monitor the test parameters at the outputs of transformation networks will also be in integrated circuit form on separate substrate chips. In some cases it is possible to locate a comparator directly upon the same chip with the circuit-transformation network combination being monitored. In FIGURE 2 the substrate chip 40 carries an integrated circuit amplifier 42, shown in block diagram form, and input and output transformation networks 44 and 46, respectively, adapted for testing the gain or amplification of the amplifier. The input signal to the amplifier at terminal 48 is used as the reference input to a comparator 52 through the voltage divider input transformation network 44 whose output is terminal 50. Terminal 50 is connected by a suitable external connection to comparator 52, shown in block diagram form, preferably constructed as an integrated circuit on the substrate chip 54. A fraction of the output signal of the amplifier 42 is taken, by means of the voltage divider output transformation network 46, as the test input to the comparator through either of two terminals 56 or 58 selectable by means of a suitable switching matrix 57. The switching matrix is formed on a separate substrate chip 60, as diagrammatically shown, and the test input 62 of the comparator 52 may be connected through output terminal 62' of the switching matrix, to either of the two switching matrix inputs 56' and 58'.

If the gain of the amplifier is 10, then $\frac{1}{10}$ of the output signal is used as the test input for comparison with the amplifier input. Thus the comparator will indicate a balance when amplifier operation is as specified. To minimize loading, resistor $R_9$ is employed as an isolation resistor, and the combination of resistors $R_9$ and $R_{10}$ reduces the input signal to a level acceptable to the comparator.

Resistors $R_{11}$, $R_{12}$ and $R_{13}$ comprising the voltage divider transformation network 46 and have values chosen to reduce the output signal by the gain of the amplifier, plus an equivalent reduction to that imposed on the input signal by resistors $R_9$ and $R_{10}$. Thus, if resistors $R_9$ and $R_{10}$ reduce the input signal by a factor $n$, then resistors $R_{11}$, $R_{12}$ and $R_{13}$ must reduce the output signal by a factor $nA$ where A represents the gain of the amplifier. Resistor $R_{12}$ is selected with respect to the total resistance of network 46 such that between resistors $R_{11}$ and $R_{12}$ there exists a voltage whose amplitude represents the upper acceptable limit of gain of the amplifier, and between resistors $R_{12}$ and $R_{13}$ there exists a voltage whose amplitude represents the lower acceptable limit of the gain of the amplifier. Thus the upper and lower limits may be tested by comparator 52 upon selection by switching matrix 57.

While two examples of specific applications of the combination according to the invention have been given herein, it will be recognized readily by those skilled in the art that many variations and applications of the invention are possible to test any of numerous operational parameters and conditions transferred or converted by means of transformation networks, into test or measurement signals representative thereof, whereby suitable comparators or other test equipment may be utilized for monitoring of operating circuit conditions.

What is claimed is:

1. In circuit apparatus of the type including a physical substrate and solid state electrical elements deposited thereon and electrically interconnected to form an operational circuit, the combination with such operational circuit of a transformation network adapted to test operating parameters thereof, said transformation network comprising electrical elements deposited on the same physical substrate and electrically interconnected with points in said operational circuit, means in said network for converting operating parameters in the operational circuit into a test parameter in the transformation network, including means continuously operable to permit simultaneous operation of said network and said operational circuit without significant electrical interference of said network with said circuit, and an output for said test parameter from which to detect operating conditions of said operational circuit.

2. In circuit apparatus of the type including a physical substrate and solid state electrical elements deposited thereon and electrically interconnected to form an operational circuit, the combination of an operational electronic circuit and a test transformation network interconnected therewith, both said circuit and said network comprising electrical elements formed on the same physical substrate and including electrical elements operable to serve dual functions as portions of both said operational circuit and said transformation network and means adapting said circuit and network to perform operational and test functions, respectively, each without significant electrical interference with the operation of the other, said transformation network further including connections to test points in said operational circuit, means for converting operational parameters at said points to a test parameter in said network and an output for said test parameter from which to detect operating conditions of said operational circuit.

3. In circuit apparatus of the type including a physical substrate and solid state electrical elements deposited thereon and electrically interconnected to form an operational circuit, the combination with such operational circuit of a transformation network adapted to testing operating parameters thereof, said transformation network comprising electrical elements deposited on the same physical substrate and responsively coupled with said operational circuit to detect an operating parameter therein and convert said operating parameter into a test parameter, said operational circuit and transformation network including means operable to permit continuous simultaneous operation thereof without significant electrical interference of said network with said circuit, and an output for said test parameter from which to detect operating conditions of said operational circuit.

References Cited

UNITED STATES PATENTS

| | | | |
|---|---|---|---|
| 2,851,660 | 9/1958 | Tobin | 324—73 |
| 2,970,260 | 1/1961 | Flint | 324—73 |

RUDOLPH V. ROLINEC, Primary Examiner

E. L. STOLARUN, Assistant Examiner

U.S. Cl. X.R.

317—235